Feb. 27, 1951        P. J. SMITH        2,543,605
DISPLAY MOUNTING FOR AUTOMOTIVE VEHICLES
Filed June 1, 1945
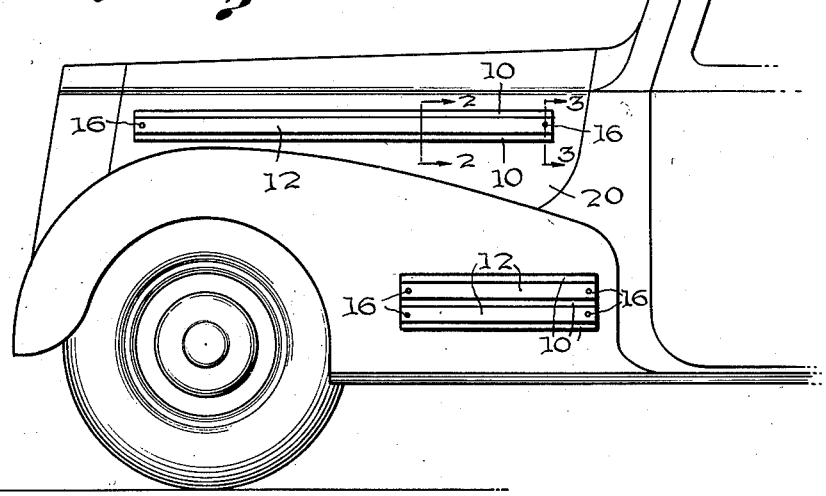
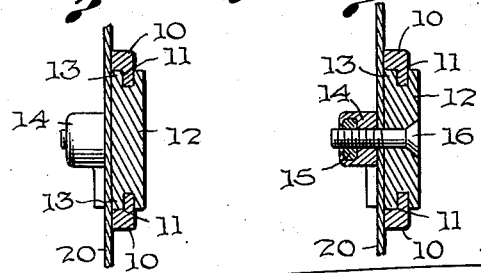
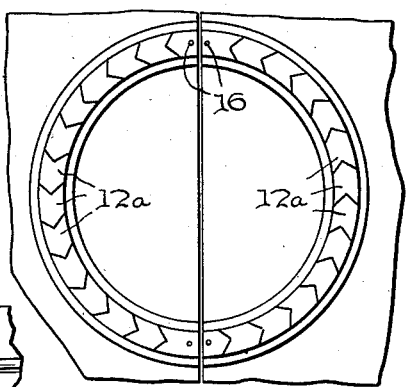
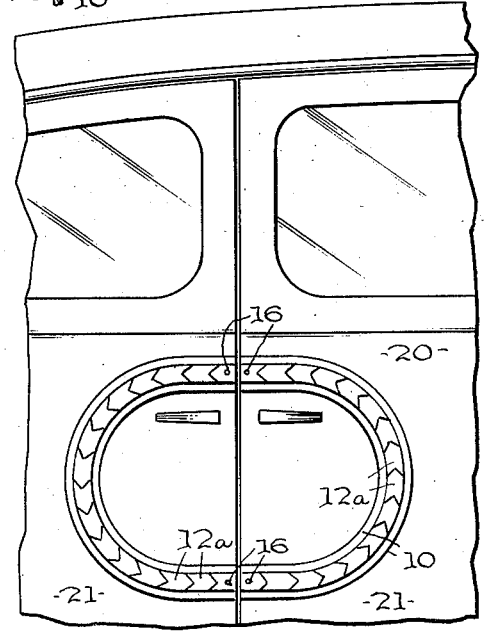
INVENTOR.
PAUL J. SMITH
BY
*Church & Church*
HIS ATTORNEYS Patented Feb. 27, 1951

2,543,605

UNITED STATES PATENT OFFICE 2,543,605

DISPLAY MOUNTING FOR AUTOMOTIVE VEHICLES

Paul J. Smith, Seattle, Wash.

Application June 1, 1945, Serial No. 597,107

2 Claims. (Cl. 40—64)

This invention relates to a display mounting for use on the bodies of automotive vehicles.

One object of the invention is to provide a mounting for display matter wherein the trim strips generally used for decorative purposes on the bodies of vehicles, principally automobiles, serve not only their ornamental function but also the function of retaining the matter to be displayed.

As is well known the bodies of automobiles often carry advertising matter and in the case of passenger vehicles stickers are frequently applied to the body or windshield for display purposes. Among the disadvantages of these types of advertising or display matter it might be mentioned that stickers applied to windshields are always more or less unsightly and somewhat dangerous by reason of the fact that they may, and usually do, reduce the range of the driver's vision. When advertising matter is displayed directly on the body of the vehicle it is usually painted or otherwise permanently applied so that repainting of the body is practically a necessity if it should become desirable to change such matter.

The primary object of the present invention, therefore, is to provide means for mounting or attaching display matter on vehicle bodies without detracting from the appearance of the vehicle and in such a manner that the wording or appearance of the matter on display can be changed at any time without affecting the surface finish of the body.

More specifically, particularly in the case of automobiles, the invention contemplates attaching the display matter to the body by means which, in and of themselves possess decorative characteristics in that they resemble the strips of chromium or other rust-proof materials which are now commonly used for embellishing automobile bodies.

With these and other objects in view, the invention consists in certain details of construction and combinations and arrangements of parts, all as will hereinafter be more fully described and the novel features thereof particularly pointed out in the appended claims.

In the accompanying drawings—

Figure 1 illustrates the invention as applied to the body of an automobile, the latter being shown more or less diagrammatically;

Fig. 2 is a sectional view on the line 2—2 of Fig. 1;

Fig. 3 is a sectional view on the line 3—3 of Fig. 2;

Fig. 4 illustrates a modified application of the invention; and

Fig. 5 illustrates a modified form of display member.

In carrying out the present invention, especially in connection with automobiles, it is desirable to do so without detracting from the present day general appearance of such vehicles. That is, practically all makes of automotive vehicles are ornamented with trim of rust-proof material usually in the form of strips, mounted on the body along the hood and along the fenders as well as at other points and the present invention contemplates using substantially the same type of ornamental parts for attaching advertising or any desired character of display matter to the body surface.

For instance, as shown in Figs. 1 to 3, in lieu of the usual trim material now commonly used on automobile bodies, members here referred to as trim tracks are used. The trim tracks, indicated at 10 are attached to the body surface 20 in any suitable manner and are arranged in opposed, spaced pairs with grooves 11 formed in the opposed faces of the tracks for slidably receiving structural members carrying the matter to be displayed. The display matter is shown in Figs. 1 to 3 as being imprinted on a continuous strip 12 of any suitable material provided at its edges with flanges 13 which engage in grooves 11 of the opposed trim tracks. The strip 12 can be slipped endwise between the tracks and is preferably secured in place by machine screws 16 which extend through the strip and are rigidly secured in elastic stop nuts 14 welded or flush riveted to the inner surface of the vehicle body. As is well understood, these elastic stop nuts comprise a more or less elastic member or disk 15, usually of compressed fibers, which binds on the screw 16. This form of attachment is preferred as it eliminates rattling or other objectionable sounds. It will be apparent that the strip 12 may carry any desired advertising matter, slogan, insignia, or the like such as is often seen on automotive vehicles either in the form of printed matter on the body itself or on stickers usually attached to glass portions of the body. Not only does the present arrangement preserve the pleasing appearance of the vehicle but, as will also be appreciated, the mounting of the strip or slide 12 is such that different strips can be substituted or used interchangeably merely by removing the screws 16. Also, the strip or slide 12 can, if desired, be produced from almost any of the present day plastics with color schemes to add to its attractiveness.

Fig. 4 shows the use of the trim tracks in circular form, preferably spanning the break in the body 20 formed by the door 21 to facilitate assembly of the display matter in the tracks. In tracks of this and other curved contours, assembly of the display matter can also be facilitated by using comparatively short individual display members or blocks each carrying a portion of the display, as shown at 12ᵃ in Fig. 5. In this arrangement, individual letters can be placed on separate blocks inserted in succession between the trim tracks in proper order or sequence. Where the trim tracks constitute a circle or other closed figure, the fastening screws might be dispensed with although it is probably preferable to use screws 16 in the blocks that are located next adjacent to the line along which the sections of tracks are separated, as along the edge of the doors in the present illustration.

The invention is not limited to use in mounting display matter on automobile bodies only, or to the particular points at which the trim tracks are located in the present illustration, it being very apparent that the trim tracks can be used on other bodies such as aeroplanes without departing from the spirit of the invention.

What is claimed is:

1. A changeable display mounting for an automotive vehicle body comprising a pair of opposed ornamental tracks mounted in spaced relation on the exterior surface of said body, said ornamental tracks having longitudinal grooves formed in their opposed surfaces, said grooves being open at their opposite ends, a series of slides having flanges on opposite sides for engaging in the grooves of said tracks to carry the slides on said vehicle body, said slides being insertable in the space between said tracks at the open ends thereof, each of said slides carrying a portion of a composite display extending longitudinally along said tracks, a pair of end slides, one end slide in each end of said tracks, the edges of the end slides being flush with the ends of said tracks, nuts secured to the interior surfaces of said vehicle body, one nut being positioned to correspond with each of said end slides, and bolts extending through the respective end slides and engaging said nuts to releasably secure said slides and permit the display to be changed by substituting other slides.

2. A changeable display mounting for an automotive vehicle body composed, at least in part, of a fixed panel and a door panel hinged at one edge with its opposite free edge forming a joint with an edge of the fixed panel, said mounting comprising a first pair of opposed ornamental tracks mounted in spaced relation on the exterior surface of said opposed panel and having their ends abutting the joint between said panels, a second pair of opposed ornamental tracks mounted in spaced relation on the exterior surface of said door panel and having their ends abutting the joint between said panels in alinement with the ends of said first pair of tracks, all of said tracks having longitudinal grooves formed in their opposed surfaces, said grooves being open at their ends, a series of slides having flanges on opposite sides for engaging in the grooves of said tracks to carry the slides on said panels with the tracks adjacent said joint in registration, each of said slides carrying a portion of a composite display extending longitudinally along said tracks and across said joint, and releasable fastening elements extending through the slides at the ends of said tracks for releasably securing said slides on said panels and permitting the display to be changed by substituting other slides.

PAUL J. SMITH.

REFERENCES CITED

The following references are of record in the file of this patent:

UNITED STATES PATENTS

| Number | Name | Date |
|---|---|---|
| 207,319 | Tatham | Aug. 20, 1878 |
| 210,595 | Burhans | Dec. 10, 1878 |
| 596,831 | Roebuck | Jan. 4, 1898 |
| 950,498 | Vormbaum | Mar. 1, 1910 |
| 1,192,866 | Clements | Aug. 1, 1916 |
| 1,323,339 | Watters | Dec. 2, 1919 |
| 1,340,778 | Lane et al. | Mar. 18, 1920 |
| 1,387,217 | Watters | Aug. 9, 1921 |
| 1,451,986 | Kilpatrick | Apr. 17, 1923 |
| 1,726,628 | Rennerfelt | Sept. 3, 1929 |
| 1,776,952 | Watters | Sept. 30, 1930 |
| 1,943,440 | Horni | Jan. 16, 1934 |
| 1,943,740 | Olson | Jan. 16, 1934 |
| 1,954,348 | Deservi | Apr. 10, 1934 |
| 2,030,730 | Wilson | Feb. 11, 1936 |
| 2,159,745 | Marshall | May 23, 1939 |
| 2,274,192 | Deaton | Feb. 24, 1942 |

FOREIGN PATENTS

| Number | Country | Date |
|---|---|---|
| 72,071 | Switzerland | of 1926 |
| 256,130 | Great Britain | of 1926 |
| 825,317 | France | Dec. 8, 1937 |